(12) United States Patent
Kunkel et al.

(10) Patent No.: US 9,202,500 B2
(45) Date of Patent: Dec. 1, 2015

(54) DEVICES HAVING ELECTRODES ON THE TRAILING EDGE SURFACE

(71) Applicant: SEAGATE TECHNOLOGY LLC, Cupertino, CA (US)

(72) Inventors: Gary J. Kunkel, Minneapolis, MN (US); Ajaykumar Rajasekharan, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/574,834

(22) Filed: Dec. 18, 2014

(65) Prior Publication Data

US 2015/0179201 A1  Jun. 25, 2015

Related U.S. Application Data

(60) Provisional application No. 61/918,704, filed on Dec. 20, 2013.

(51) Int. Cl.
*G11B 5/60* (2006.01)

(52) U.S. Cl.
CPC .................................. *G11B 5/6082* (2013.01)

(58) Field of Classification Search
CPC ............ G11B 5/60; G11B 5/33; G11B 5/147; G11B 5/127
USPC ......... 360/234.4, 234.5, 125.3, 125.03, 324.1
See application file for complete search history.

(56) References Cited

U.S. PATENT DOCUMENTS 6,972,933 B1 * 12/2005 Wada et al. ................... 360/323
8,693,141 B1 * 4/2014 Elliott et al. ............... 360/123.1

2001/0000022 A1 * 3/2001 Shiroishi ....................... 360/324
2005/0231855 A1 * 10/2005 Tran ........................... 360/324.1
2006/0098322 A1 * 5/2006 Yamagishi ..................... 360/66
2006/0221511 A1 * 10/2006 Saruki et al. ................ 360/324.2
2007/0097549 A1 * 5/2007 Yamaguchi et al. .......... 360/129
2008/0037182 A1 * 2/2008 Albrecht et al. .............. 360/323
2010/0157477 A1 * 6/2010 Morinaga et al. ........ 360/125.12
2011/0026167 A1 * 2/2011 Duan et al. ................. 360/246.2
2011/0038080 A1 * 2/2011 Alex et al. ................ 360/123.02
2011/0038081 A1 * 2/2011 Contreras et al. ........ 360/125.03
2012/0043977 A1 * 2/2012 Kremin et al. ................ 324/686
2012/0049868 A1 * 3/2012 Maharyta ...................... 324/679
2012/0299175 A1 * 11/2012 Tran ............................. 257/712

OTHER PUBLICATIONS

Yi, Ui-Chong et al., "Characterization of Electrowetting Actuation on Addressable Single-Side Coplanar Electrodes," *J. Micromech. Microeng.* 16 (2006), 2053-2059.
Chang, Jong-Hyeon et al., "Simplified Ground-Type Single-Plate Electrowetting Device for Droplet Transport," *Journal of Electrical Engineering & Technology*, vol. 6, No. 3,pp. 402-440, 2011.
Nelson, Wyatt C. et al., "Droplet Actuation by Electrowetting-on-Dielectric (EWOD): A Review," *Journal of Adhesion Science and Technology*, 26, 1747-1771, 2012.

* cited by examiner

*Primary Examiner* — Allen T Cao
(74) *Attorney, Agent, or Firm* — Mueting, Raasch & Gebhardt, P.A.

(57) ABSTRACT

A slider that includes a slider body, the slider body having a trailing edge surface and an opposing leading edge surface; an air bearing surface (ABS) between the trailing edge surface and the leading edge surface; a read/write head located on the trailing edge surface of the slider body; an electrode array located on the trailing edge surface of the slider body, the electrode array including at least a first electrode and at least a second electrode; and first and second bias circuits, wherein the first bias circuit is electrically coupled to the at least first electrode and the second bias circuit is electrically coupled to the at least second electrode.

20 Claims, 5 Drawing Sheets

DEVICES HAVING ELECTRODES ON THE TRAILING EDGE SURFACE

PRIORITY

This application claims priority to U.S. Provisional Application No. 61/918,704 filed Dec. 20, 2013 entitled "DEVICE INCLUDING A SLIDER HAVING AT LEAST TWO ELECTRODES ON THE TRAILING EDGE SURFACE", the disclosure of which is incorporated herein by reference thereto.

SUMMARY

Disclosed is a slider that includes a slider body, the slider body having a trailing edge surface and an opposing leading edge surface; an air bearing surface (ABS) between the trailing edge surface and the leading edge surface; a read/write head located on the trailing edge surface of the slider body; an electrode array located on the trailing edge surface of the slider body, the electrode array including at least a first electrode and at least a second electrode; and first and second bias circuits, wherein the first bias circuit is electrically coupled to the at least first electrode and the second bias circuit is electrically coupled to the at least second electrode.

Also disclosed is a slider a slider body, the slider body having a trailing edge surface and an opposing leading edge surface; an air bearing surface (ABS) between the trailing edge surface and the leading edge surface; a read/write head located on the trailing edge surface of the slider body; an electrode array located on the trailing edge surface of the slider body, the electrode array including at least a first, second, and third electrode groups, wherein each electrode group includes at least two electrodes; first, second, and third bias circuits, wherein the first bias circuit is electrically coupled to the first electrode group, the second bias circuit is electrically coupled to the second electrode group, and the third bias circuit is electrically coupled to the third electrode group.

Also disclosed is a method that includes applying a voltage across at least a first electrode; applying a voltage across at least a second electrode, the second electrode positioned adjacent the first electrode; and applying a voltage across at least a third electrode, the third electrode positioned adjacent the second electrode, wherein the first, second, and third electrodes are located on a trailing edge of a slider, wherein the slider also has an adjacent air bearing surface (ABS), and wherein the sequential application of the voltages across the first, second and third electrodes cause droplets on the trailing edge to move away from the ABS of the slider on which the first, second, and third electrodes are positioned.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Systems for magnetic memory storage often include a device that is designed and configured to ride on an air bearing over a magnetic data storage disk. The magnetic data storage disk often includes a layer of lubricant in order to maintain and control the interactions of the magnetic data storage disk and the device (often referred to as slider) traveling on it on the air bearing. The lubricant, contaminants, or combinations thereof (referred to herein collectively as "lube/contaminant") can collect on the trailing edge or the trailing edge surface of the slider. If enough collects, the lube/contaminant can form droplets of lube/contaminant. These droplets, as they grow in size can grow so large that they drop off of the slider onto the disk. This can result in a vertically displaced write (VDW), which is a write error due to the head to media spacing (HMS) being too large because of the drop. Methods of controlling or eliminating this phenomenon are therefore desired.

Figure 1A:
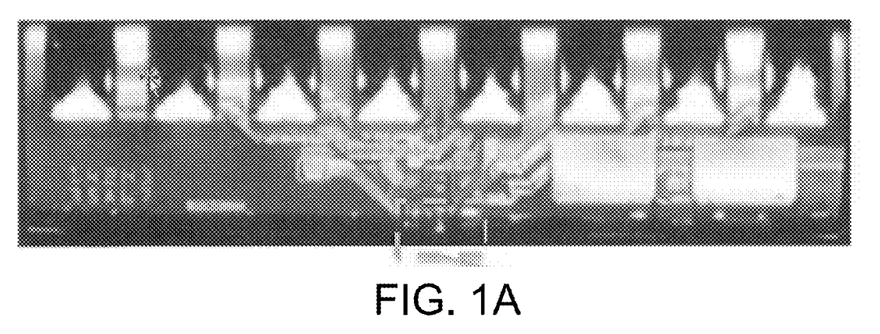
FIGS. 1A, 1B, and 1C are images of the trailing edge of a slider after contamination testing (FIG. 1A), a 500× magnification from the air bearing surface (ABS) view of the slider (FIG. 1B), and a 500× magnification from the trailing edge (FIG. 1C).
Figure 1B:
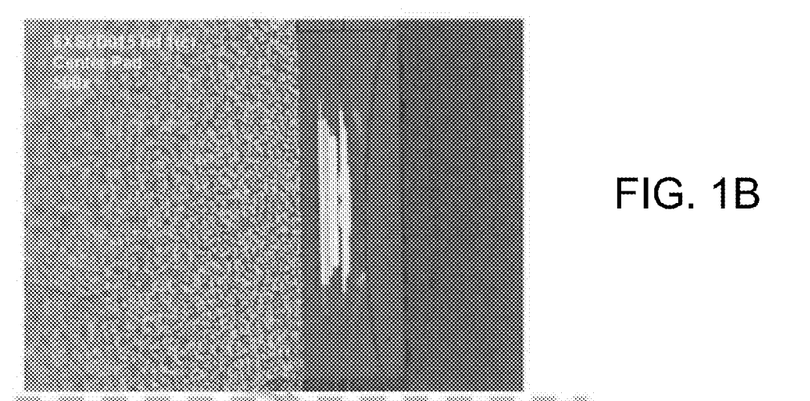
Figure 1C:
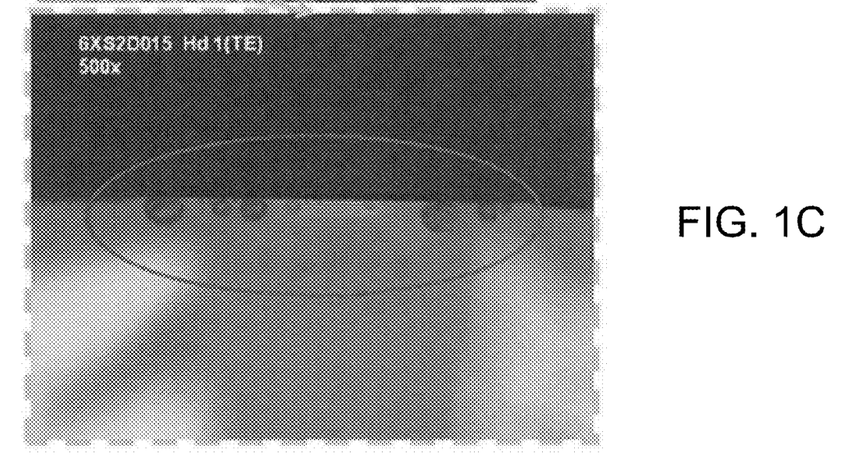

Lube/contaminant droplets on a slider are shown in FIGS. 1A, 1B, and 1C, which show the trailing edge of a hard disk drive (HDD) slider after contamination stress testing. FIG. 1A shows the trailing edge (TE) of a slider, FIG. 1B shows a 500× magnification from the air bearing surface (ABS) view of the slider, and FIG. 1C shows a 500× magnification from the trailing edge. The droplets of lube/contaminant in FIG. 1C are quite easy to see on the ABS.

Disclosed systems and devices utilize the phenomenon of electrowetting-on-dielectric (EWOD) on the slider to manipulate and/or modulate the collection of lube/contaminant on the trailing edge of sliders. Controlling the lube/contaminant could afford a reduction in downstream failures associated with trailing edge lube/contaminant collection, migration, droplet formation, droplet drop-off to disk, head/droplet interaction resulting in a vertically displaced write data loss, or any combination thereof.

Surface energy can be modified with a coplanar EWOD transducer. Equation 1 below can be derived to show how the contact angle can be changed between a bias voltage ($\Theta_V$) and voltage off ($\Theta_0$) for a circular array of electrodes (as shown in FIGS. 2A to 2D). Here $A_d$, $A_r$, and $A_t$ are the area of the driving electrodes, the reference electrodes and then the total combined area respectively; V is the bias voltage; $\in_r$ and $\in_0$ are the dielectric constants of the insulating layer and the permittivity of vacuum, respectively, $\gamma_{LG}$ is the liquid-gas interfacial energy and t is the thickness of the dielectric layer.

$$\cos\theta_V - \cos\theta_0 = \frac{\varepsilon_r \varepsilon_0}{2\gamma_{LG} t}\left(\frac{A_d}{A_t}\left(\frac{A_r}{A_d + A_r}\right)^2 + \frac{A_r}{A_t}\left(\frac{A_d}{A_d + A_r}\right)^2\right)V^2 \quad \text{(Equation 1)}$$

As seen by analyzing Equation 1, the amount of dewetting can be changed by varying the voltage, area, and dielectric thickness parameters to account for the specific lube/contaminant fluid dielectric and interfacial energy properties.

Figure 2A:
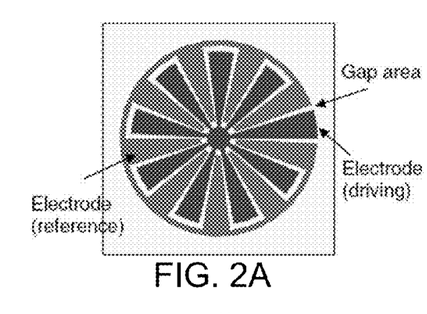
FIGS. 2A, 2B, 2C, and 2D show a particular exemplary geometry for an electrowetting transducer (FIG. 2A); an exemplary schematic of thin film electrodes, dielectrics and biasing schemes that could be utilized (FIG. 2B); a cartoon of operation (FIG. 2C); and theoretical (lines) and experimental measurement (points) of contact angle as a result of bias voltage and gap percentage between the electrodes (FIG. 2D).
Figure 2B:
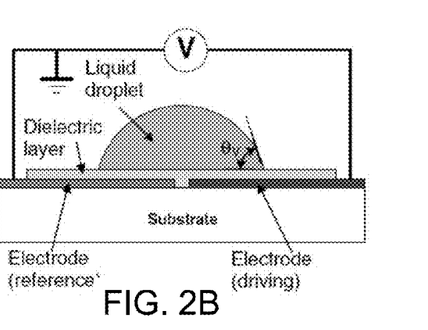
Figure 2C:
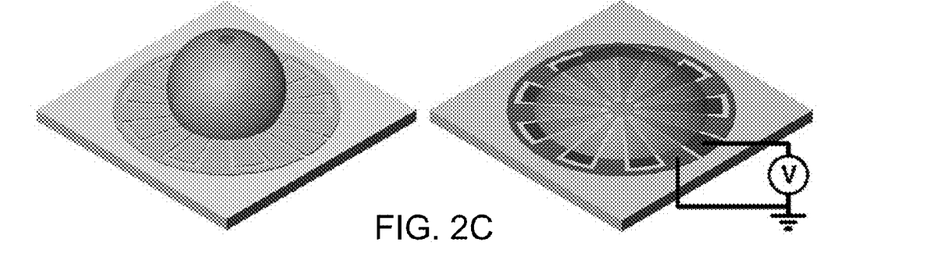
Figure 2D:
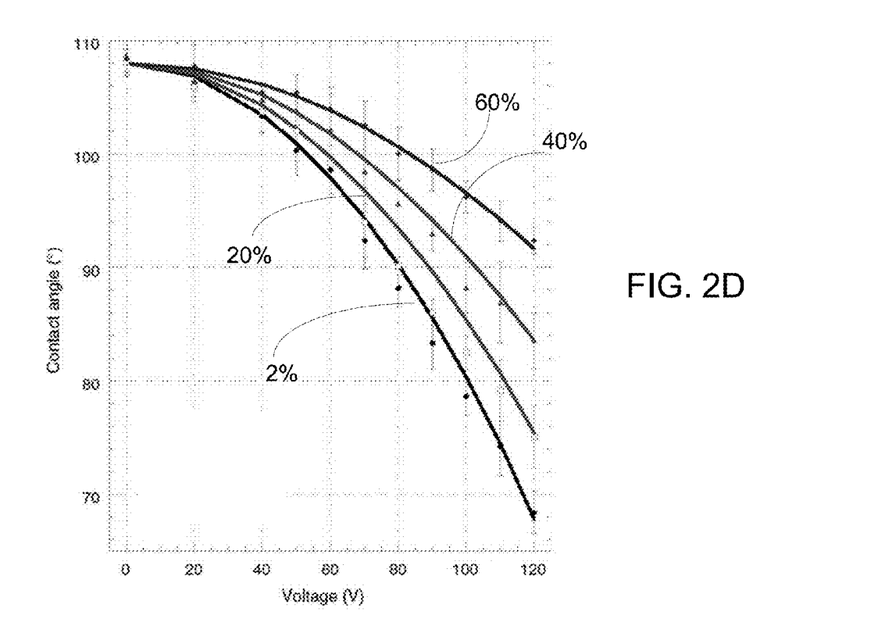

FIGS. 2A to 2D show an illustrative geometry of electrodes in an EWOD system. FIG. 2A shows a particular exemplary geometry for an electrowetting transducer. FIG. 2B shows an exemplary schematic of thin film electrodes, dielectrics and biasing schemes that could be utilized. FIG. 2C depicts the operation. FIG. 2D shows theoretical (lines) and experimental measurement (points) of contact angle as a result of bias voltage and gap percentage between the electrodes. (Yi, Ui-Chong and Kim, Chang-Jin, 2006, *Characterization of electrowetting actuation on addressable single-side coplanar electrodes*. J. Micromech. Microeng. 16, 2053-2059).

Figure 3A:
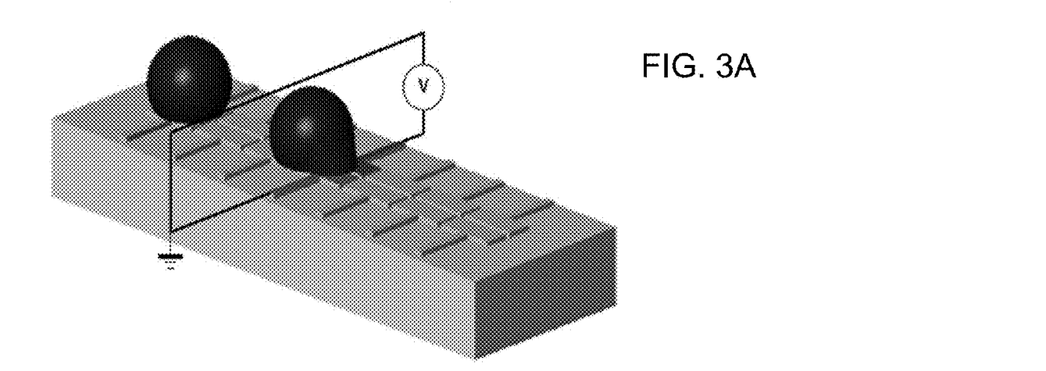
FIGS. 3A, 3B, and 3C show a cartoon depicting electrowetting actuation on single-side coplanar electrodes (FIG. 3A); a schematic depiction showing a droplet and exemplary thin film electrode, insulating, and hydrophobic layers (FIG. 3B); and images (1, 2, and 3 sequential in time) of an experimental study showing the actuation of a 2 µL deionized water droplet on the configuration shown in FIGS. 3A and 3B (FIG. 3C).
Figure 3B:
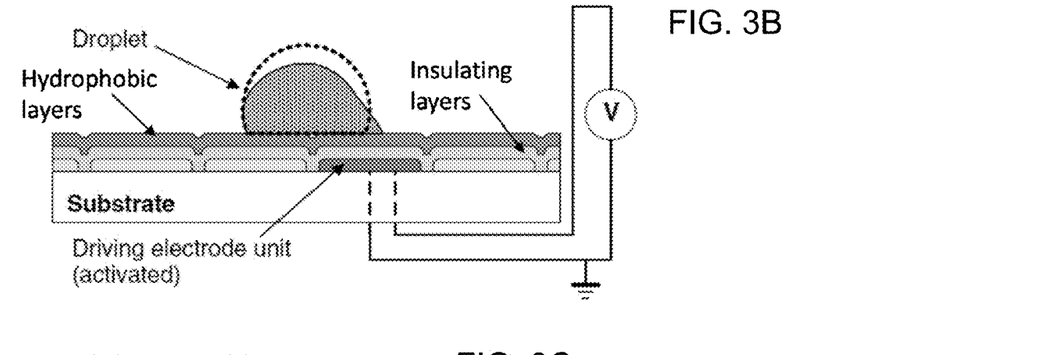
Figure 3C:
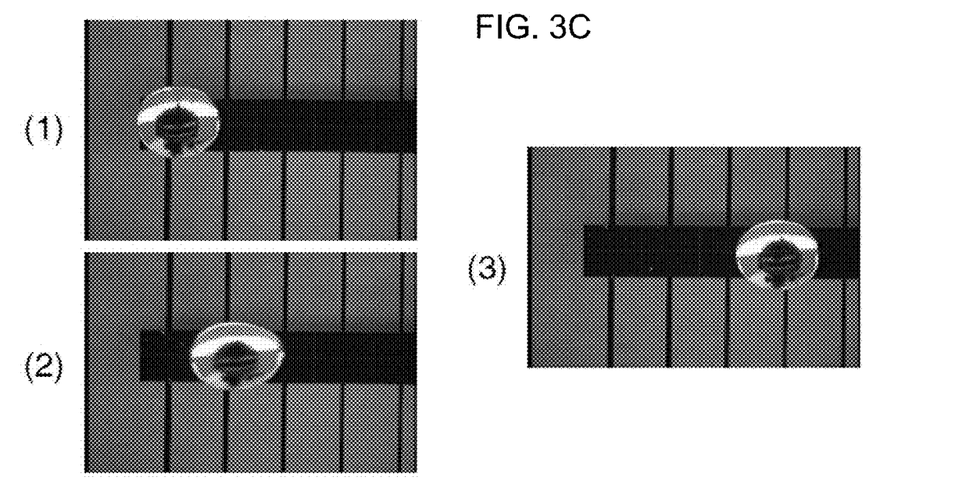

FIGS. 3A to 3C show a schematic representation of a one side coplanar EWOD and the results of an experiment utilized to move a 2 µL, deionized water droplet. FIG. 3A depicts electrowetting actuation on single-side coplanar electrodes. FIG. 3B is a schematic depiction showing a droplet and illustrative thin film electrode, insulating, and hydrophobic layers. FIG. 3C shows images (1, 2, and 3 sequential in time) of an experimental study showing the actuation of a 2 µL, deionized water droplet on the configuration shown in FIGS. 3A and 3B. (Yi, Ui-Chong and Kim, Chang-Jin, 2006, *Characterization of electrowetting actuation on addressable single-side coplanar electrodes*. J. Micromech. Microeng. 16, 2053-2059).

Disclosed devices and methods utilize the EWOD phenomenon. An example of a disclosed illustrative device can be seen in FIG. 4A. The device 20 in FIG. 4A includes a slider body 10 that has a trailing edge surface 15 and an opposing leading edge surface 25 (not seen in FIG. 4A). An air bearing surface (ABS) is located on the surface between the trailing edge surface 15 and the leading edge surface 25. When in operation with a magnetic disc, for example, the ABS of the device 20 is facing the disc. A read/write head 5 is located on or disposed in the trailing edge surface 15 of the slider body 10. The device also includes an electrode array 30 having (or made up of) at least two electrodes 27 and 29. Each electrode has (or is made up of) two electrode contact pads. For example the first electrode 27 is made up of the first electrode contact pad 27a and the second electrode contact pad 27b. A droplet sitting on the surface of the trailing edge 15 that contacts or spans the first electrode contact pad 27a and the second electrode contact pad 27b will complete the circuit between the first electrode contact pad 27a and the second electrode contact pad 27b and the voltage differential will then affect the droplet to modulate it, or example to move it from the electrode. The electrode contact pads making up an electrode can generally be described as adjacent, but not electrically contacting, to each other in a plane that is parallel to the ABS.

Figure 4A:
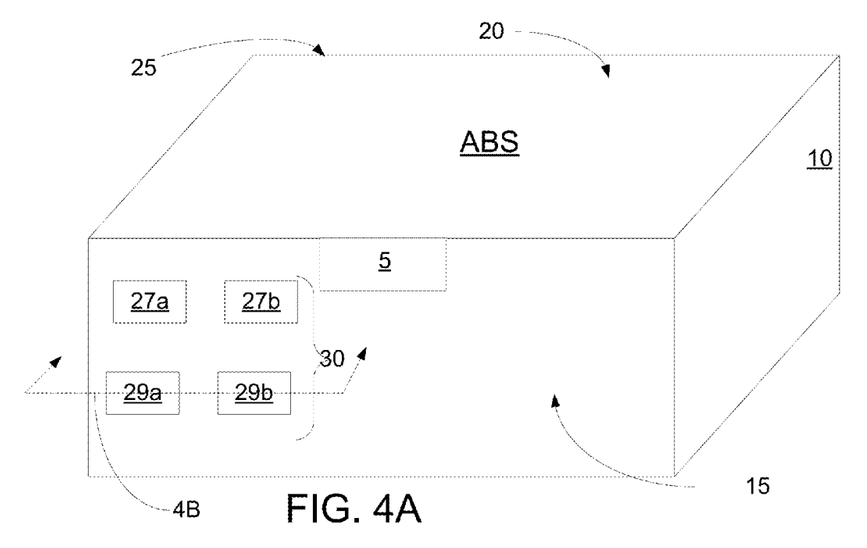
FIGS. 4A and 4B are schematic illustrations of a perspective view (FIG. 4A) and a partial cross section (FIG. 4B) of disclosed sliders including a first and second electrodes.
Figure 4B:
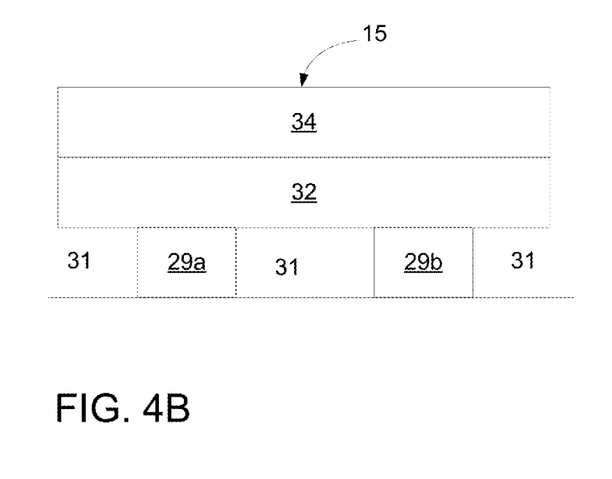

FIG. 4B shows a cross section through a portion of the device of FIG. 4A. The device in FIG. 4B includes the second electrode 29 (made of the first electrode contact pad 29a and the second electrode contact pad 29b) with an insulating dielectric layer 32 thereon and a hydrophobic layer 34 on the insulating dielectric layer 32. The insulating dielectric layer 32 can function at least in part (in combination with surrounding insulator 31) to insulate the second electrode 29 from surrounding structures (such as other electrodes for example) and insulate the first electrode contact pad 29a from the second electrode contact pad 29b. Once the first electrode contact pad 29a is electrically insulated from the second electrode contact pad 29b, only a droplet of lube/contaminant thereon can complete the circuit between the two. In some embodiments, a single layer or material could also function as the insulator 31, the dielectric layer 32 and the hydrophobic layer 34; such a material would be one with strong insulating and hydrophobic properties.

The insulating dielectric layer 32 can be made of any electrically insulating materials. Illustrative specific materials can include, for example $Al_2O_3$, $SiO_2$, $SiN_x$, $Ta_2O_5$, $ZrO_2$, or PZT (lead zirconate titanate). In some embodiments, the insulating dielectric layer 32 can be made of $Al_2O_3$. In some embodiments the insulating dielectric layer 32 can have a thickness of not less than 0.5 micrometers (µm). In some embodiments the insulating dielectric layer 32 can have a thickness of not less than 0.6 µm. In some embodiments the insulating dielectric layer 32 can have a thickness of not less than 0.7 µm. In some embodiments, the insulating dielectric layer 32 can have a thickness of not greater than 1 millimeter (mm). In some embodiments, the insulating dielectric layer 32 can have a thickness of not greater than 0.9 mm. In some embodiments, the insulating dielectric layer 32 can have a thickness of not greater than 0.8 mm.

The hydrophobic layer 34 can be made of diamond like carbon (DLC), fluoropolymers such as TEFLON®, or self assembled monolayers, for example. In some embodiments, the hydrophobic layer 34 can be made of DLC. In some embodiments, the hydrophobic layer 34 can have a thickness of not less than 10 nanometers (nm) for example. In some embodiments, the hydrophobic layer 34 can have a thickness of not less than 5 nm for example. In some embodiments, the hydrophobic layer 34 can have a thickness of not less than 20 nm for example. In some embodiments, the hydrophobic layer 34 can have a thickness of not greater than 2 µm, for example. In some embodiments, the hydrophobic layer 34 can have a thickness of not greater than 1.5 µm, for example. In some embodiments, the hydrophobic layer 34 can have a thickness of not greater than 1 µm, for example.

The electrode array 30 can include at least a first electrode 27 (made up of a first electrode contact pad 27a and a second electrode contact pad 27b) and a second electrode 29 (made up of a first electrode contact pad 29a and a second electrode contact pad 29b). The first and second electrode 27 and 29 respectively can be configured so that a voltage can be applied to the first electrode 27, or the second electrode 29. The first electrode 27 and the second electrode 29 can also be referred to as a reference electrode and a driving electrode respectively. When a voltage is applied to the first electrode 27, for example, a droplet that contacts or spans the first electrode contact pad 27a and the second electrode contact pad 27b will complete the circuit between the first electrode contact pad 27a and the second electrode contact pad 27b and the voltage will then affect the droplet to move it off the first electrode 27. This process can then be applied to the other electrodes in the electrode array 30 in order to drive or force movement of the droplet in a desired direction.

Disclosed devices can also include a control circuit (not pictured in FIG. 4A). A control circuit can be configured to apply and/or control the voltage to the electrodes in an electrode array, for example the first and second electrodes. An electrode (such as the first electrode for example) can be considered a driving electrode or a reference electrode, depending on the voltage (or lack thereof) applied thereto. In some embodiments of disclosed devices and methods, electrodes on a trailing edge surface are sequentially made by controlling the voltage applied thereto from the control circuit to be the driving electrode to drive or move a droplet in a desired direction (for example in a direction away from the ABS).

In some embodiments, electrode arrays can include more than a first and second electrode (each made up of at least two electrode contact pads). In some embodiments, an electrode array can include at least three electrodes (each made up of at least two electrode contact pads). In electrode arrays that include more than two electrodes, the function of the individual electrodes can change. Stated another way, an electrode array and associated circuitry can be configured so that a first electrode can be a driving electrode by applying a voltage in a first way and can subsequently be made to be a reference electrode by applying a voltage in a second way. When the first electrode in this instance is functioning as a reference electrode, another electrode in the electrode array will be functioning as a driving electrode. By moving the location of the driving electrode in the electrode array (a first electrode to a second electrode, and so on), a droplet on the trailing edge can be drive or forced to be moved in a desired direction.

Some electrode arrays include at least three electrodes (each made up of at least two electrode contact pads). In such embodiments, three associated circuits could be configured along with the at least three electrodes. The three circuits could be configured to allow each of the three electrodes to be the driving electrode at any given time. In some embodiments, a control circuit or a controller could further be included to control and run the three (for example) circuits.

Figure 5:
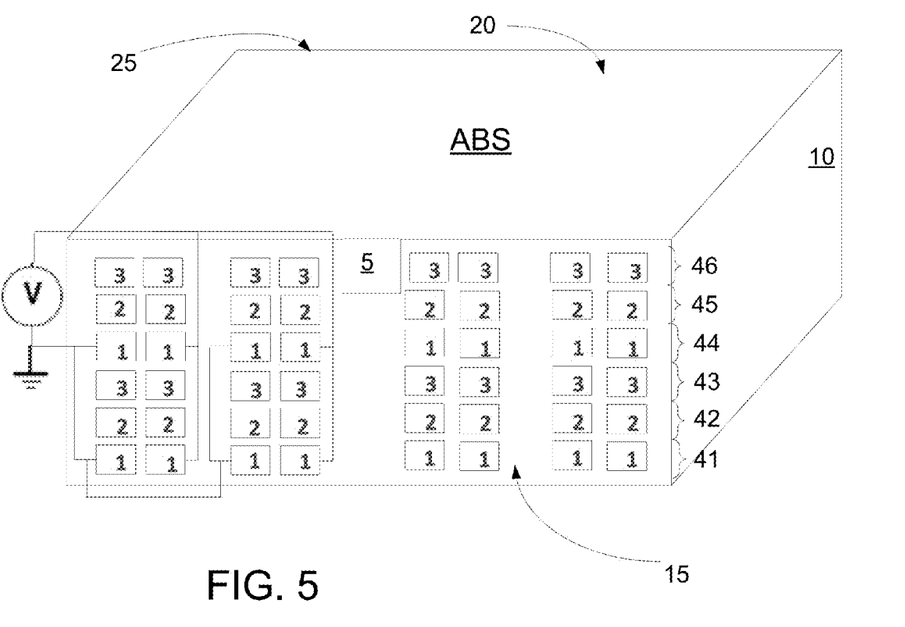
FIG. 5 is a schematic illustration of a disclosed slider including an exemplary electrode array.

FIG. 5 shows an illustrative configuration of a disclosed device. This particular illustrative electrode array includes a plurality of electrodes with each electrode made up of individual electrode contact pads. The electrode array in FIG. 5 can be explained as including six (6) electrodes. A first electrode is made up of the four (4) electrode contact pads marked number "1" on the bottom of the trailing edge surface 15. A second electrode is made up of the four (4) electrode contact pads marked number "2" closest to the bottom of the trailing edge surface 15. A third electrode is made up of the four (4) electrode contact pads marked number "3" closest to the bottom of the trailing edge surface 15. A fourth electrode is made up of the four (4) electrode contact pads marked number "1" in the vicinity of the middle of the trailing edge surface 15. A fifth electrode is made up of the four (4) electrode contact pads marked number "2" closest to the top of the trailing edge surface 15. A sixth electrode is made up of the four (4) electrode contact pads marked number "3" closest to the top of the trailing edge surface 15.

In some embodiments each electrode contact pad can be configured to be or be electrically coupled (or connected) to a single bias circuit. So, with respect to the illustrative embodiment depicted in FIG. 5. The four electrode contact pads in the first electrode (the four electrode contact pads marked with a 1 at the bottom of the trailing edge surface 15), referred to as first electrode 41, can all be connected to a single bias circuit (referred to herein as a first bias circuit). The four electrode contact pads in the second electrode (the four electrode contact pads marked with a 2 towards the bottom of the trailing edge surface 15), referred to as second electrode 42, can all be connected to a single bias circuit (referred to herein as a second bias circuit). The four electrode contact pads in the third electrode (the four electrode contact pads marked with a 3 at the vicinity of the middle of the trailing edge surface 15), referred to as third electrode 43, can all be connected to a single bias circuit (referred to herein as a third bias circuit). The four electrode contact pads in the fourth electrode (the four electrode contact pads marked with a 1 at the vicinity of the middle of the trailing edge surface 15), referred to as fourth electrode 44, can all be connected to a single bias circuit (referred to herein as a fourth bias circuit). The four electrode contact pads in the fifth electrode (the four electrode contact pads marked with a 2 towards the top of the trailing edge surface 15), referred to as fifth electrode 45, can all be connected to a single bias circuit (referred to herein as a fifth bias circuit). The four electrode contact pads in the sixth electrode (the four electrode contact pads marked with a 3 towards the top of the trailing edge surface 15), referred to as sixth electrode 46, can all be connected to a single bias circuit (referred to herein as a sixth bias circuit).

In embodiments such as those just described with respect to FIG. 5, illustrative methods can include biasing the electrodes in sequential order for example. For example in some embodiments, the sixth electrode could be biased, followed by the fifth electrode, followed by the fourth electrode, followed by the third electrode, followed by the second electrode, and followed by the first electrode.

In some embodiments, more than one bias circuit could also be controlled by combining them after they exit the electrode area and/or the slider. In some embodiments, for example each third electrode could also be on the same bias circuit. Such a configuration could become even more important in embodiments including larger number of electrodes (e.g., more than the six electrodes depicted in FIG. 5). For example, therefore, the first electrode and the fourth electrode (both made up of "1" electrodes) could be biased together, the second electrode and the fifth electrode (both made up of "2" electrodes) could be biased together, and the third electrode and the sixth electrode (both made up of "3" electrodes) could be biased together. Such a configuration could allow for a more limited and/or simple external circuitry (for example bond pads), for example such a configuration could allow for only three bond pads (each one controlling one of the bias circuits) and a ground (and electrically coupled control circuitry). In such embodiments, droplets on the trailing edge of the slider body could be moved away from the ABS by energizing the bias circuits as first (and fourth), second (and fifth), and then third (and sixth). The sequential biasing (first, second, then third) could be repeated at any interval and at any number of repetitions.

In some embodiments, individual electrode contact pads can have a size that is on the order of a lube/contaminant droplet. In some embodiments, individual electrode contact pads can have dimensions as small as 5 micrometers (μm), for example. In some embodiments, individual electrode contact pads can have dimensions as large as 1 millimeter (mm), or as large as 20 μm, for example. In some embodiments, larger numbers of electrodes, numbers of individual electrode contact pads in an electrode (e.g., FIG. 4A has two for example, and FIG. 5 has four), or any combination thereof can be utilized. In some embodiments, the number of electrodes, numbers of individual electrode contact pads in an electrode, or a combination thereof can be dependent, at least in part on the exposed (unused by the read/write head and/or other features) surface area of the trailing edge of the slider, the size of each individual electrode contact pad (which may or may not necessarily be the same), particular regions of the trailing edge of the slider to have electrodes thereon, or some combination thereof. Vice versa, in some embodiments, the size of each individual electrode contact pad (which may or may not necessarily be the same) can be dependent, at least in part on the exposed (unused by the read/write head and/or other features) surface area of the trailing edge of the slider, number of electrodes, numbers of individual electrode contact pads in an electrode, or a combination thereof, particular regions of the trailing edge of the slider to have electrodes thereon, or some combination thereof.

Methods are also disclosed herein, disclosed methods can include methods of moving a droplet on a trailing edge surface of a slider, for example. In some embodiments, such methods can include application of a voltage to a first electrode, application of a voltage to a second electrode, and application of a voltage to a third electrode. Such method steps can cause lube/contaminant that may be present on the trailing edge of the slider to move away from the ABS. Utilizing the device depicted in FIG. 5 as an example, application of a voltage to the four electrode contact pads in the sixth electrode 46 will move a droplet (or droplets) onto the sixth electrode 46; removing the voltage to the sixth electrode 46 (turning that electrode off) and applying a voltage to the fifth electrode 45 will move a droplet (or droplets) onto the fifth electrode 45; removing the voltage to the fifth electrode 45 (turning that electrode off) and applying a voltage to the fourth electrode 44 will move a droplet (or droplets) onto the fourth electrode 44; removing the voltage to the fourth electrode 44 (turning that electrode off) and applying a voltage to the third electrode 43 will move a droplet (or droplets) onto the third electrode 43; removing the voltage to the third electrode 43 (turning that electrode off) and applying a voltage to the second electrode 42 will move a droplet (or droplets) onto the second electrode 42; removing the voltage to the second electrode 42 (turning that electrode off) and applying a voltage to the first electrode 41 will move a droplet (or droplets) onto the first electrode 41.

In some embodiments, methods can include sequential applications of voltages in the indicated order (first, second, third). In some embodiments, methods can include application of voltages to a second set of first, second and third electrodes, with the second set of first, second and third electrodes being located farther away from the ABS than the first set of electrodes. Application of the voltages to the second set of first, second and third electrodes can be accomplished via a same (or a different) first, second and third bias circuits that controlled application of voltages to the first set of first, second, and third electrodes. In some embodiments, control circuitry, a control circuit, or a controller can control application of the voltage or voltages as utilized in any disclosed methods.

In some embodiments, the same or a different voltage may be applied to any of the electrodes. In some embodiments, a voltage of at least 20 V can be applied to any electrode. In some embodiments, a voltage of at least 50 V can be applied to any electrode. In some embodiments, a voltage of not greater than 100 V can be applied to any electrode. In some embodiments, a voltage of not greater than about 200 V can be applied to any electrode. In some embodiments, the same or a similar (within the variability of a controller or control circuit) voltage can be applied to all electrodes in a method. In some embodiments, different voltages can be applied to one or more than one electrode in a method.

Voltages can be applied to one or more than one electrodes at various times with respect to or in consideration of outside processes. In some embodiments for example, a voltage(s) can be applied to one or more electrodes of an electrode array (in a desired sequence for example) when the slider is dwelling on the magnetic media, for example dwelling on a track of the magnetic media. In some embodiments for example, a voltage(s) can be applied to one or more electrodes of an electrode array (in a desired sequence for example) immediately before the slider is parked on a magnetic media, e.g., before memory access is being at least temporarily halted. In some embodiments for example, a voltage(s) can be applied to one or more electrodes of an electrode array (in a desired sequence for example) immediately before the slider is to be moved in position over a magnetic media, e.g. before memory access is to be undertaken. In some embodiments for example, a voltage(s) can be applied to one or more electrodes of an electrode array (in a desired sequence for example) whenever the slider has power applied thereto, e.g., the voltages can be applied at all times when the larger system (e.g., the computer or device including the memory storage) is powered on.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices having electrodes on the trailing edge surface are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

The invention claimed is:

1. A slider comprising:
   a slider body, the slider body having a trailing edge surface and an opposing leading edge surface;
   an air bearing surface (ABS) between the trailing edge surface and the leading edge surface;
   a read/write head located on the trailing edge surface of the slider body;
   an electrode array located on the trailing edge surface of the slider body, the electrode array comprising at least a first electrode and at least a second electrode; and
   first and second bias circuits, wherein the first bias circuit is electrically coupled to the at least first electrode and the second bias circuit is electrically coupled to the at least second electrode.

2. The slider according to claim 1, wherein the first electrode comprises at least a first electrode contact pad and a second electrode contact pad; and the second electrode comprises at least a first electrode contact pad and a second electrode contact pad.

3. The slider according to claim 2, wherein the first electrode contact pad and the second electrode contact pad of the first electrode are adjacent to each other in a plane that is parallel to the ABS.

4. The slider according to claim 1 further comprising a third electrode and a third bias circuit, wherein the third bias circuit is electrically coupled to the third electrode.

5. The slider according to claim 1, further comprising control circuitry electrically coupled to at least the first and second bias circuits.

6. The slider according to claim 4, wherein at least two of the at least three electrodes are configured to function as reference electrodes and at least one of the at least three electrodes is configured to function as a driving electrode.

7. The slider according to claim 2, wherein the electrode contact pads of the electrodes independently have dimensions from about 5 μm to about 1 mm.

8. The slider according to claim 1, wherein all of the electrodes in the electrode array are individually addressable.

9. A slider comprising:
   a slider body, the slider body having a trailing edge surface and an opposing leading edge surface;
   an air bearing surface (ABS) between the trailing edge surface and the leading edge surface;
   a read/write head located on the trailing edge surface of the slider body;
   an electrode array located on the trailing edge surface of the slider body, the electrode array comprising at least first, second, and third electrodes, wherein each electrode comprises at least two electrode contact pads,
   first, second, and third bias circuits, wherein the first bias circuit is electrically coupled to the first electrode, the second bias circuit is electrically coupled to the second electrode, and the third bias circuit is electrically coupled to the third electrode.

10. The slider according to claim 9, wherein the electrode contact pads of the electrodes independently have dimensions from about 5 μm to about 1 mm.

11. The slider according to claim 9, wherein the first, second, and third bias circuits are each individually electrically coupled to first, second, and third bond pads and a ground.

12. The slider according to claim 9, the device further comprising a second set of first, second and third electrodes, and wherein the second set of first second and third electrodes are electrically coupled to the first bias circuit, the second bias circuit, and the third bias circuit respectively.

13. A method for making a slider comprising:
   applying a voltage to at least a first electrode, the first electrode comprising at least a first electrode contact pad and a second electrode contact pad;
   applying a voltage to at least a second electrode, the second electrode positioned adjacent the first electrode and the second electrode comprising at least a first electrode contact pad and a second electrode contact pad;
   applying a voltage to at least a third electrode, the third electrode positioned adjacent the second electrode and the third electrode comprising at least a first electrode contact pad and a second electrode contact pad,
   wherein the first, second, and third electrodes are located on a trailing edge of a slider, wherein the slider also has an adjacent air bearing surface (ABS), and wherein the sequential application of the voltages to the first, second and third electrodes cause droplets on the trailing edge to move away from the ABS of the slider on which the first, second, and third electrodes are positioned.

14. The method according to claim 13, further comprising sequential application of voltages along a second set of first, second, and third electrodes, wherein the second set of electrodes are farther away from the ABS than the first set of electrodes.

15. The method according to claim 13, wherein the voltages range from about 20 V to about 200 V.

16. The method according to claim 13, wherein the voltages range from about 50 V to about 100 V.

17. The method according to claim 13, wherein the voltages are applied when the slider is dwelling on a track of magnetic media.

18. The method according claim 13, wherein the voltages are applied immediately before the slider is parked on a magnetic media.

19. The method according to claim 13, wherein the voltages are applied immediately before the slider is to be moved in position over a magnetic media.

20. The method according to claim 13, wherein the voltages are applied whenever the slider has power applied thereto.

* * * * *